United States Patent [19]

Nale

[11] Patent Number: 5,793,385
[45] Date of Patent: Aug. 11, 1998

[54] ADDRESS TRANSLATOR FOR A SHARED MEMORY COMPUTING SYSTEM

[75] Inventor: William H. Nale, Livermore, Calif.

[73] Assignee: Chips and Technologies, Inc., San Jose, Calif.

[21] Appl. No.: 662,057

[22] Filed: Jun. 12, 1996

[51] Int. Cl.$^6$ ................................................ G06F 12/06
[52] U.S. Cl. ................................................ 345/515
[58] Field of Search ....................... 395/501, 502, 395/503, 504, 508, 515, 521, 526; 364/200

[56] References Cited

U.S. PATENT DOCUMENTS

| | | | |
|---|---|---|---|
| 4,513,369 | 4/1985 | Sato | 364/200 |
| 5,257,387 | 10/1993 | Richer et al. | 395/284 |
| 5,313,577 | 5/1994 | Meinerth et al. | 395/502 |
| 5,450,542 | 9/1995 | Lehman et al. | 395/512 |
| 5,636,335 | 6/1997 | Robertson et al. | 395/515 |
| 5,659,715 | 8/1997 | Wu et al. | 395/497.01 |

*Primary Examiner*—Raymond J. Bayerl
*Assistant Examiner*—Cao H. Nguyen
*Attorney, Agent, or Firm*—D'Alessandro & Ritchie

[57] ABSTRACT

An address translator for use in a system having a central processing unit, a graphics controller for generating graphics addresses which index a graphics memory address map and for feeding data to a visual display, and a system memory converts a graphics address to a system address within the system memory. The invention initially partitions the system memory into a dedicated system memory for use by the graphics controller and a non-dedicated system memory for use by the central processing unit. The dedicated system memory corresponds to a base assigned memory within the graphics memory address map, and the non-dedicated system memory corresponds to a portion of the graphics memory address map excluding the base assigned memory. If the graphics address is within the base assigned memory, the graphics address is translated to a corresponding system address within the dedicated system memory. If the graphics address is within the portion of the graphics memory address map excluding the base assigned memory, the address translator converts the graphics address to a system address within the non-dedicated system memory, which designates a starting address of an available system memory block. Upon completion of the translation of the graphics address to the non-dedicated system memory, the boundary selector then selects a specific address within this allocated memory block corresponding to the graphics address.

36 Claims, 2 Drawing Sheets

5,793,385

1

ADDRESS TRANSLATOR FOR A SHARED MEMORY COMPUTING SYSTEM

BACKGROUND OF THE INVENTION

1. Field of the Invention

The present invention relates to memory address translation and, more particularly, to a method facilitating the operation of a computer graphics system in which a central processing unit and a graphics controller share a memory, and the resulting architecture.

2. Description of Related Art

A computer either has, or is designed to interface with, a display monitor. Such a computer requires memory space for use by both the computer's central processing unit (CPU) and a graphics controller, which controls the display placed on the monitor. Memory space is typically provided by two separate memories: a system memory for use by the CPU and a memory for use by the graphics controller. Alternatively, a single memory may be shared by a CPU and a graphics controller. The memory space required by the graphics controller, however, varies according to the graphics mode used. For example, a high resolution mode requires more memory space than a low resolution mode. To avoid the necessity of making the shared memory sufficiently large that it can handle the CPU and all graphics modes that might be required by the graphics controller, the prior art typically dedicates to the graphics controller an amount of system memory sufficient only for a low resolution mode. This creates two problems. First, it is necessary to reboot the system to dedicate more memory to the graphics controller whenever a more demanding graphics mode is to be used. Second, when additional memory space is allocated to the graphics controller for use of a new mode, the amount of memory then available to the computer operating system is limited. A need exists in the prior art for a method for dynamically allocating additional memory to the graphics controller from the system memory.

SUMMARY OF THE INVENTION

The present invention enables a system memory to be shared by a graphics controller without requiring a user to reboot the system to accomodate more demanding graphics modes. Furthermore, the amount of memory available to the computer operating system is increased by dedicating a minimal amount of system memory to the graphics controller, and dynamically allocating additional system memory to the graphics controller to satisfy the memory requirements of a selected graphics mode.

According to a first aspect of the present invention, a portion of system memory is dedicated upon start-up to the graphics controller. This memory block is allocated from the top of system memory, and corresponds to a base assigned memory allocated from the bottom of a graphics memory address map.

According to a second aspect of the present invention, the translator compares the graphics address to the size of the base assigned memory. If the graphics address is within this dedicated area, an address selector outputs a system address within the dedicated system memory. If the graphics address is not within the area dedicated to the graphics controller, the address selector will dynamically allocate a memory block within the system memory.

According to a third aspect of the present invention, the translator translates a graphics address within the base assigned memory into a system address within the dedicated system memory.

2

According to a fourth aspect of the present invention, additional system memory may be dynamically allocated to the graphics controller. Although most graphics controllers are designed to address contiguous memory, those portions of a system memory that might be usable by a graphics controller generally are not contiguous. The address translator translates, or converts, contiguous graphics addresses generated by a graphics controller into non-contiguous addresses in the system memory. The translation occurs in real-time and the system memory address corresponds to an available portion of the system memory. A memory block is available if it is not otherwise being used by the computer operating system.

Translation of non-dedicated system memory is achieved with a look-up table. The starting address of each allocated memory block in system memory is stored in a location in the look-up table. According to the presently preferred embodiment, each memory block must be a specified size (i.e., 64 K bytes). Therefore, the look-up table, and the memory containing the look-up table, can be smaller than required to accomodate a direct mapping of the addresses.

According to a fifth aspect of the present invention, a greater number of starting addresses than contained in the look-up table can accessed. According to the presently preferred embodiment of the present invention, 4 K byte blocks of system memory can be addressed within 64 K byte blocks stored in the look-up table, allowing the 64 K blocks to be allocated on 4 K byte boundaries.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

According to a presently preferred embodiment of the present invention, an address translator translates a graphics address generated by a graphics controller into a system memory address. The translator first determines whether the graphics address to be translated is within the dedicated portion of system memory. If the address is not within the dedicated system memory, an available portion of system memory is allocated through a look-up table. Furthermore, through the use of a binary adder, the system memory address space can be addressed with a finer granularity than the blocks of system memory identified by the look-up table. According to the presently preferred embodiment, 64 K blocks of system memory can be allocated on 4 K byte boundaries.

Figure 1:
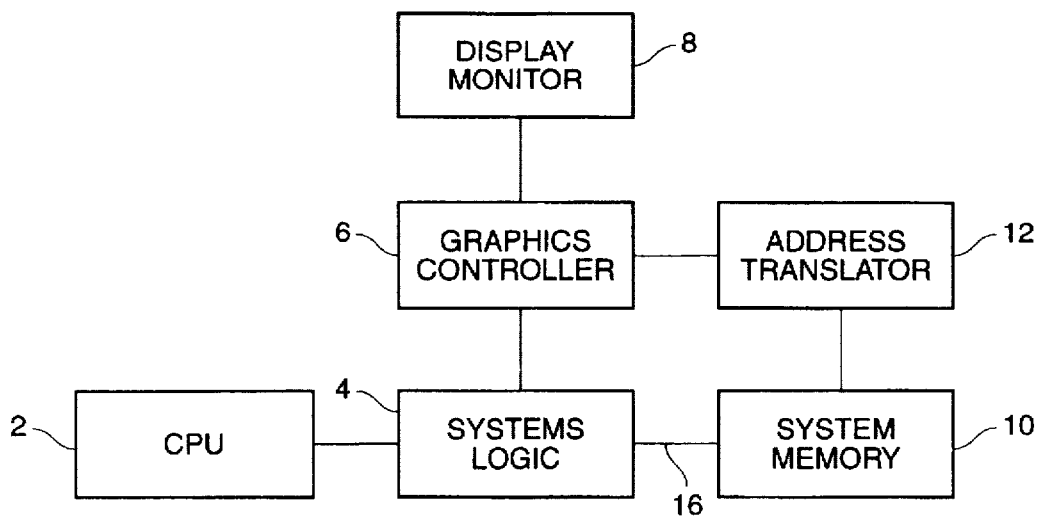
FIG. 1 is a block diagram providing the basic operational flow of a preferred embodiment of the invention.

Referring to FIG. 1, a block diagram providing the basic operational flow of a preferred embodiment of the invention is shown. The computer architecture includes a CPU 2 and systems logic 4 for interfacing the CPU 2 with other components, such as a graphics controller. A graphics controller 6 controls and issues data for a visual display provided by a display monitor 8. A system memory 10 provides memory for the CPU 2 via the systems logic 4. In addition, the system memory 10 provides memory for the graphics controller 6 via an address translator 12. The address translator 12 is positioned to intercept addresses generated by the graphics controller 6 and translate same into addresses in the system memory 10.

According to the presently preferred embodiment of the present invention, the system memory 10 is used by the CPU 2 in connection with its data operations, and by the graphics controller 6. In a shared memory arrangement of this kind, it is typical to dedicate a portion of the system memory 10 to the graphics controller 6 for its use. This dedicated portion typically is no larger than needed by the graphics controller 6 in a graphics mode requiring little memory (i.e., low resolution mode). For example, it is relatively common to provide a system memory of 8 megabytes, with one megabyte being dedicated to use by the graphics controller. However, while one megabyte is sufficient memory space for the graphics controller when it is in a low resolution mode, more memory is needed for higher resolution graphics.

One advantage of the address translator 12 is that it dynamically allocates additional system memory 10 space to the graphics controller 6 as required by various graphics modes. As a result, it becomes unnecessary to reboot the computer when a new graphics mode is selected. However, there is a possibility that the memory space required by the graphics controller may be greater than the contiguous memory space available in the system memory. The operating system allocates memory blocks in 4 K byte increments. Typically, a graphics controller will refuse portions of the system memory offered to it which are not of a predetermined size. For example, according to the presently preferred embodiment, a system memory block must have a size of at least 64 K bytes. Any memory blocks which are less than 64 K bytes can be given back to the operating system by the software driver. Furthermore, although the operating system will allocate memory in 4 K byte blocks, contiguous sections of 64 K bytes or more can reasonably be expected. Accordingly, the translator assumes that any blocks of memory from the operating system will be at least 64 K in size.

Figure 2:
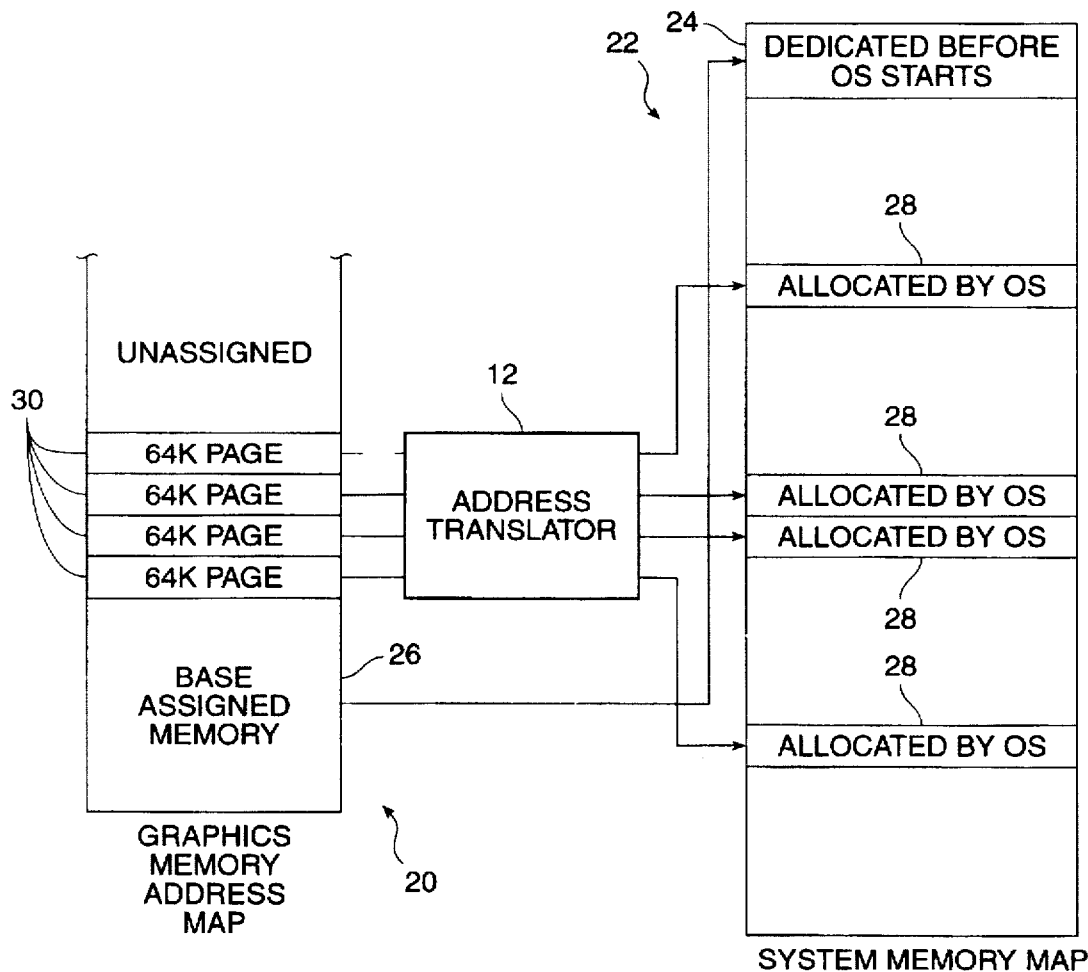
FIG. 2 is an example of an address translator converting contiguous graphics addresses generated by a graphics controller into non-contiguous addresses in the system memory according to the presently preferred embodiment of the invention.

Referring now to FIG. 2, the translator 12 of the present invention is illustrated converting graphics addresses generated by a graphics controller into addresses in the system memory, according to the presently preferred embodiment of the invention. A graphics memory address map 20 illustrates the contiguous graphics addresses generated by the graphics controller. Similarly, a system memory map 22 illustrates the non-contiguous addresses corresponding to available memory blocks in the system memory.

According to a presently preferred embodiment, the system memory is approximately 256 megabytes, starting at location 0 in the system memory. The system address comprises bits 0:27, or a total of 28 bits, to address this memory space. For the purposes of the present invention, the system memory is divided into two portions. A first portion of the system memory is a dedicated system memory 24, a block of system memory dedicated to the graphics controller at start-up. According to a first aspect of the present invention, a means for partitioning the system memory into the dedicated system memory 24 and a non-dedicated system memory when the computer system is first booted is provided. The means for partitioning comprises a graphics memory dedicator for creating the dedicated system memory 24. As embodied herein, the graphics memory dedicator comprises software which allocates the dedicated system memory 24 from the top of the system memory, corresponding to a base assigned memory 26 allocated from the bottom of the graphics memory address map 20. The top of the system memory is the highest installed system memory location, and the bottom of the graphics memory address map 20, address 0, is the lowest address that may be generated by the graphics controller. According to the preferred embodiment of the present invention, the dedicated system memory 24 comprises 1 Megabyte. However, one of ordinary skill in the art will recognize that a greater or smaller amount of system memory may be dedicated to the graphics controller.

A second portion of the system memory is the system memory below the dedicated system memory 24. This portion will hereinafter be referred to as the non-dedicated system memory. The present invention dynamically allocates this memory to the graphics controller upon a request to the operating system for a block of memory of a particular size.

The maximum memory required by the graphics controller is approximately 4 megabytes, starting at location 0 of the graphics memory address map 20. According to the presently preferred embodiment of the present invention, the base assigned memory 26 comprises a 1 M area starting at location 0 of the graphics memory address map 20.

When the display mode is changed, the graphics controller will request that additional memory be allocated to it. Since the system memory is allocated to the graphics controller during real-time operation, the allocated system memory blocks 28 are not necessarily contiguous. The graphics addresses 30 provided by the graphics controller, however, are contiguous. Thus, the memory blocks will appear contiguous to the graphics device.

Figure 3:
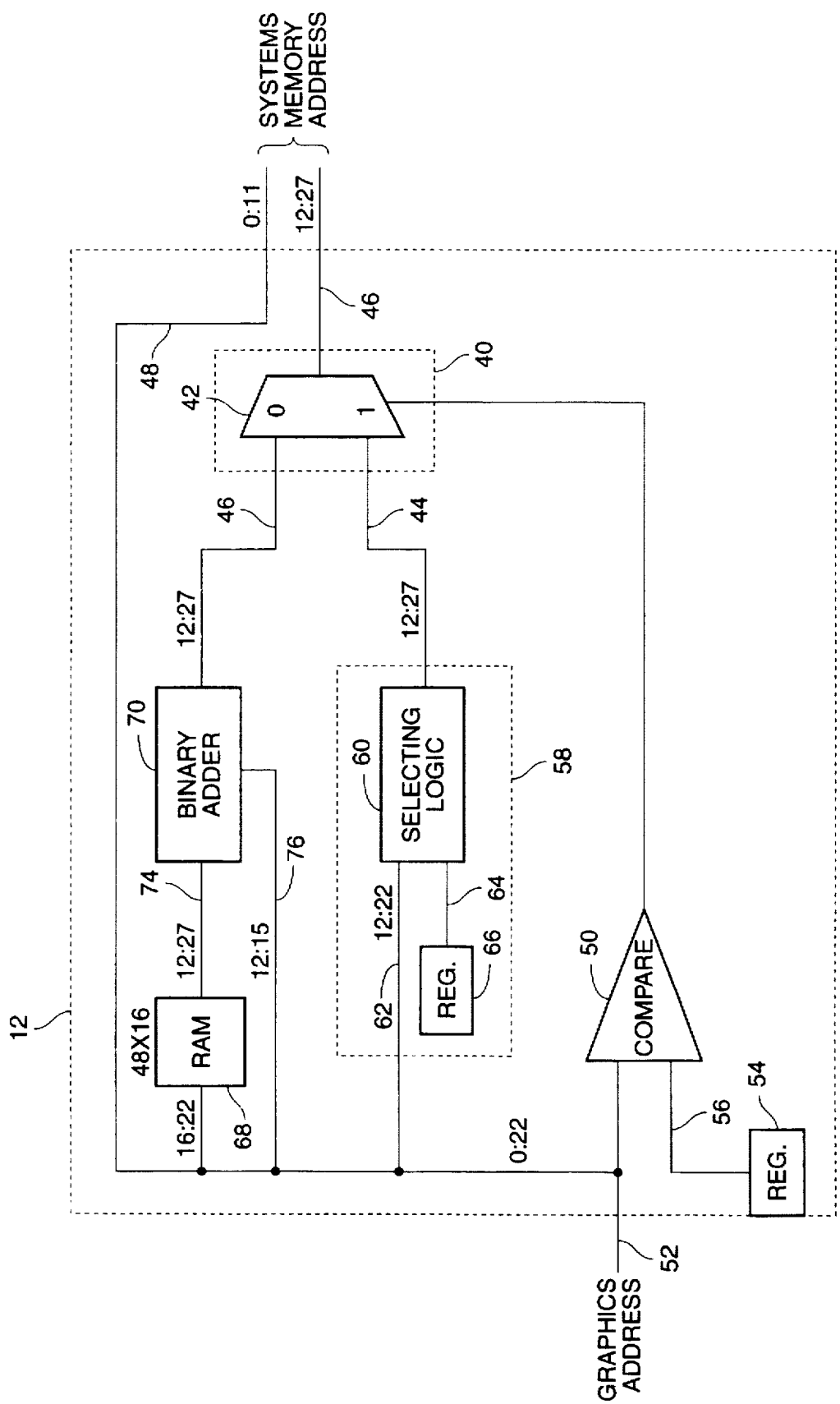
FIG. 3 is an expanded view of the address translator of the preferred embodiment of the invention.

Referring now to FIG. 3, an expanded view of the address translator 12 of the preferred embodiment of the invention is shown. According to a second aspect of the present invention, an address selecting means 40 determines whether a system address within the dedicated system memory will be output from the address translator, or whether memory within the system memory must be dynamically allocated. According to the presently preferred embodiment, the address selecting means 40 comprises an address selector, multiplexer 42. If the graphics address is within the base assigned memory, a first data input 44 to the multiplexer 42 is selected, and an address within the dedicated system memory is output. However, if the graphics address is not within this fixed range, a second data input 46 to the multiplexer 42 is selected, and an address corresponding to an available block of system memory is output. The output of the multiplexer 42 comprises the most significant bits of the system memory address, while the lower bits 48 of the system memory address are passed through the translator 12 from the graphics address.

A comparator 50 is used to determine whether the graphics address is within the base assigned memory. The graphics address provided by the graphics controller feeds a first input 52 of the comparator 50. A register 54 storing the size of the area dedicated to the graphics controller feeds a second input 56 of the comparator 50. To determine whether the graphics address is within the base assigned memory, the comparator 50 compares the graphics address to the size of the area dedicated to the graphics controller, contained in the register 54. If the address is within this fixed range, the result of the comparison will be "true" or 1. However, if the address is not within this fixed range, the result of the comparison will be 0. The output of this comparator 50 feeds the select line to the multiplexer 42.

The graphics address comprises bits 0:22, or a total of 23 bits. Bits 0–2 address specific bytes within a 64 bit block, and bits 3–11 address bytes within a 4 K location. Since the translator does not access memory blocks less than 4 K bytes in size, these lower bits 48 addressing locations within a 4 K byte memory block can be ignored, and are always passed through the translator unmodified.

According to a third aspect of the present invention, if the graphics address is within the base assigned memory, the graphics address is translated to an address within the dedicated system memory. As embodied herein, a means for mapping the graphics address to a system address within the dedicated system memory comprises a dedicated system memory translator 58. As embodied herein, the dedicated system memory translator comprises selecting logic 60 having a first input 62 operatively coupled to graphics address bits 12:22 and a second input 64 operatively coupled to a register 66. The register 66 contains an address corresponding to the highest memory location in the system memory. Since the dedicated system memory starts at this uppermost location in the system memory, the memory is allocated downward from this highest memory location. Furthermore, since the graphics memory address map starts at location 0, the graphics address supplies the offset from the highest memory location. Thus, the selecting logic 60 effectively subtracts the graphics address from the highest system memory address stored within the register. An output of the selecting logic comprises bits 12:27 of the system memory address. According to the presently preferred embodiment, a granularity of 256 K is provided, and the most significant bits of the system memory address are generated by inverting bits 18:22 from the graphics address and concatenating these inverted bits to bits 23:27 of the system memory address, obtained from the register containing the uppermost system address. Bits 12:17 are passed through unmodified. This output is operatively coupled to the first data input 44 of the address selecting means 40.

If the graphics address is not within the base assigned memory, the graphics address must be translated to a system address pointing to memory which has been obtained from the computer operating system. This system address corresponds to a starting address of an available portion of system memory obtained by the software driver.

According to a fourth aspect of the present invention, a means for translating the graphics address to a system address within the non-dedicated system memory is provided. The means for translating the graphics address to a system address within the non-dedicated system memory comprises a non-dedicated system memory translator. As embodied herein, the non-dedicated system memory translator comprises a look-up table 68 which stores the starting address of each allocated memory block within the system memory. The size of memory required for the look-up table 68 is dependent upon the number of allocated memory blocks, and therefore the size of the allocated memory blocks. According to the presently preferred embodiment of the present invention, 48 64 K byte blocks may be dynamically allocated, for a total of 3 M of memory, in addition to the 1 M dedicated system memory. One of ordinary skill in the art will recognize that a different number of system memory blocks may be allocated. Similarly, an allocated system memory block may be larger, or smaller, than 64 K in size. However, allocating memory in 64 K increments minimizes the size of memory (i.e., RAM) that is required for the look-up table 68, since only 48 locations in the look-up table 68 are required. If memory were allocated in 4 K increments, 768 locations would be required in the lookup table 68 to allocate the same 3 M of memory. Since the amount of RAM required for such a look-up table would be expensive to implement in many technologies, this invention employs a technique to reduce this memory size. Alternatively, allocating memory in blocks larger than 64 K, while reducing the size of memory required for a look-up table, would diminish the chances of getting the proper amount of memory allocated from the operating system.

When the graphics mode is changed, the software driver requests the additional needed memory from the operating system. In response to this request, the operating system will respond with the starting addresses of available memory blocks. In the unlikely event that there is an insufficient amount of memory available, an appropriate error message will be given to the user. Furthermore, the software driver will reject any memory blocks of less than the requested size. For each allocated memory block within the system memory, the starting address of this memory block will be written to a location in the look-up table 68. For example, if 1 M of additional system memory is needed, the starting addresses of 16 available 64 K memory blocks are stored in 16 corresponding locations in the look-up table 68. Therefore, the number of locations used in the look-up table 68 will depend upon the number of allocated memory blocks.

According to the presently preferred embodiment, the look-up table 68 allows 64 K byte sections to be allocated, with each 64 K byte section lying on a 4 K byte address boundary. According to the presently preferred embodiment, this look-up table 68 is stored in RAM. An input to the look-up table 68 is address lines 16:22 from the graphics address. Bits 16:21 determine which 64 K block of memory the graphics controller is requesting. These 6 bits can select 64 locations within this look-up table 68, corresponding to a total of 4 M available to the graphics controller. However, the first 16 locations address the bottom 1 M in graphics memory, which is the minimum memory dedicated to the graphics controller. It follows that only 48 locations are necessary in the look-up table 68 to address the remaining 3 M, which can be dynamically allocated. Therefore, a 48 location look-up table is used, each location containing 16 bits. Since the system address comprises bits 0:27, the output of the lookup table 68 comprises address lines 12:27. These address lines 12:27 contain the starting address of each 64 K block.

According to a fifth aspect of the present invention, a boundary selecting means is provided to allow a greater number of starting addresses than contained in the look-up table 68 to be accessed. As embodied herein, the boundary selecting means comprises a boundary selector, binary adder 70. Through the use of the binary adder 70, the system memory address space can be addressed with a finer granularity than the size of the blocks of system memory identified by the look-up table 68. The binary adder 70 outputs a system address on a 4 K boundary, since this is the boundary in which the operating system will allocate memory. A first input 74 to the binary adder 70 is the mapped address from the look-up table 68 comprising bits 12:27 . A second input 76 to the binary adder 70 comprises bits 12:15 of the graphics address, which select the 4 K byte area within the 64 K byte memory block being requested by the graphics controller. The first input 74 and the second input 76 are added by the binary adder 70, and the output comprises address lines 12:27, denoting the actual 4 K byte block being accessed. This output is operatively coupled to the second data input 46 of the address selecting means 40. Address bits 0:11 of the graphics address are passed directly through as system address bits 0:11.

Example

| Address Bits | 27:24 | 23:20 | 19:16 | 15:12 | 11:3 |
|---|---|---|---|---|---|
| Graphics Address | — | --01 | 0100 | 0110 | 010101010 |
| Look-up table output (of location 01 0100) | 0010 | 0100 | 1001 | 1101 | — |
| final address | 0010 | 0100 | 1010 | 0011 | 010101010 |

Bits 21:16 of the graphics address select the location in the look-up table which contains address 249D (hex). Bits 15:12 of the graphics address are added to this to produce a memory address of 24A3 (hex).

In summary, the address translator 12 dedicates a portion of the system memory to the graphics controller 6, and dynamically allocates additional memory to the graphics controller 6 when a user selects a graphics mode requiring additional memory. Through the use of a look-up table 68 and a binary adder 70, the size of RAM required for the look-up table 68 is minimized. This combination further allows 64 K byte blocks to be allocated on 4 K byte boundaries.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for converting a graphics address to a system address, the method being implemented within a computer system having an operating system, a central processing unit, a graphics controller for generating graphics addresses which index a graphics memory address map and for feeding data to a visual display, and a system memory to be shared by the central processing unit and the graphics controller, the graphics address being generated by the graphics controller and the system address denoting an address within the system memory, the method comprising the following steps:

partitioning the system memory into a dedicated system memory for use by the graphics controller and a non-dedicated system memory for use by the central processing unit, the dedicated system memory corresponding to a base assigned memory within the graphics memory address map, the non-dedicated system memory corresponding to a portion of the graphics memory address map excluding the base assigned memory;

mapping the graphics address to a corresponding system address within the dedicated system memory when the graphics address is within the base assigned memory;

translating the graphics address to a system address within the non-dedicated system memory when the graphics address is within the portion of the graphics memory address map excluding the base assigned memory, the system address within the non-dedicated system memory designating a starting address of an available memory block within the non-dedicated system memory;

selecting a boundary address within the available memory block upon completion of the translating step, based upon the system address generated during the translating step and the graphics address; and outputting the system address generated during the mapping step when the graphics address is within the base assigned memory, and otherwise outputting the system address generated during the selecting step.

2. The method according to claim 1, wherein the system memory is a memory defined by a highest installed memory location and a lowest installed memory location, wherein the graphics memory address map is an address range defined by a top corresponding to a highest address that can be generated by the graphics controller and a bottom corresponding to a lowest address that can be generated by the graphics controller, wherein the step of partitioning allocates the dedicated system memory starting from the highest installed memory location, and wherein the base assigned memory is defined by an area starting at the bottom of the graphics memory address map.

3. The method according to claim 2, wherein the step of mapping subtracts the graphics address from the highest installed memory location to generate the system address.

4. The method according to claim 3, wherein the system address within the system memory is defined by bits 0 through 27 inclusive, wherein the graphics address within the graphics memory address map is defined by bits 0 through 22 inclusive, the system address bits 0 through 17 inclusive equal the graphics address bits 0 through 17 inclusive, the system address bits 18 through 22 inclusive are formed by inverting the graphics address bits 18 through 22 inclusive, and the system address bits 23 through 27 inclusive equal bits 23 through 27 inclusive of the highest installed memory location.

5. The method according to claim 1, the step of translating further comprising the steps of:

obtaining an additional amount of the system memory sufficient to accomodate a selected graphics mode; and selecting the system address from the additional amount in response to the graphics address.

6. The method according to claim 5, the step of obtaining further comprising the steps of:

allocating an available block of the system memory;

choosing one of a plurality of locations in a look-up table, each of the plurality of locations selectable by the graphics address; and storing a starting address of the available block in the one of a plurality of locations.

7. The method according to claim 6, the step of allocating further comprising the steps of:

requesting from the operating system an available system memory block; and rejecting the available system memory block if the memory block is less than a specified size.

8. The method according to claim 7, wherein the specified size is 64 K bytes and wherein a block of the system memory is an available system memory block when not otherwise being used by the operating system.

9. The method according to claim 6, wherein the step of choosing includes selecting the one of the plurality of locations in response to a third portion of the graphics address, the third portion comprising the uppermost bits of the graphics address.

10. The method according to claim 9, wherein each of the plurality of locations contains bits 12 through 27 inclusive of the system address, and the third portion comprises bits 16 through 21 inclusive of the graphics address.

11. The method according to claim 6, wherein the available memory block is allocated on a 4 K byte boundary.

12. The method according to claim 1, wherein the step of selecting includes adding the system address generated by the step of translating to a second portion of the graphics address.

13. The method according to claim 12, wherein the second portion comprises bits 12 through 15 inclusive of the graphics address.

14. The method according to claim 1, wherein a first portion of the graphics address is passed through unmodified.

15. The method according to claim 14, wherein the first portion comprises bits 0 through 11 inclusive of the graphics address.

16. The method according to claim 1, wherein the available memory block is allocated on a 4 K byte boundary.

17. An address translator for translating a graphics address generated by a graphics controller to a system address when a user-selected graphics mode requires that additional memory be allocated to the graphics controller, the address translator for use with a computer system having a central processing unit, the graphics controller for generating graphics addresses which index a graphics memory address map and for feeding data to a visual display, and a system memory to be shared by the central processing unit and the graphics controller, the system address denoting an address within the system memory corresponding to a dynamically allocated block of the system memory, the address translator comprising:

means for partitioning the system memory into a dedicated system memory for use by the graphics controller and a non-dedicated system memory for use by the central processing unit, the dedicated system memory corresponding to a base assigned memory within the graphics memory address map, the non-dedicated system memory corresponding to a portion of the graphics memory address map excluding the base assigned memory;

means for translating the graphics address to a system address within the non-dedicated system memory when the graphics address is within the portion of the graphics memory address map excluding the base assigned memory, the system address within the non-dedicated system memory designating a starting address of an available memory block within the non-dedicated system memory; and boundary selecting means for selecting a boundary address within the available memory block in response to the system address generated by the translating means and the graphics address.

18. An address translator for converting a graphics address to a system address, the address translator for use with a computer system having an operating system, a central processing unit, a graphics controller for generating graphics addresses which index a graphics memory address map and for feeding data to a visual display, and a system memory to be shared by the central processing unit and the graphics controller, the graphics address being generated by the graphics controller and the system address denoting an address within the system memory, the address translator comprising:

means for partitioning the system memory into a dedicated system memory for use by the graphics controller and a non-dedicated system memory for use by the central processing unit, the dedicated system memory corresponding to a base assigned memory within the graphics memory address map, the non-dedicated system memory corresponding to a portion of the graphics memory address map excluding the base assigned memory;

means for mapping the graphics address to a corresponding system address within the dedicated system memory when the graphics address is within the base assigned memory;

means for translating the graphics address to a system address within the non-dedicated system memory when the graphics address is within the portion of the graphics memory address map excluding the base assigned memory, the system address within the non-dedicated system memory designating a starting address of an available memory block within the non-dedicated system memory;

boundary selecting means operatively coupled to the means for translating, the boundary selecting means adapted for selecting a boundary address within the available memory block based upon the system address generated by the means for translating and the graphics address; and address selecting means for outputting the system address generated by the mapping means when the graphics address is within the base assigned memory, and otherwise outputting the system address generated by the boundary selecting means.

19. An address translator for converting a graphics address to a system address, the address translator for use with a computer system having an operating system, a central processing unit, a graphics controller for generating graphics addresses which index a graphics memory address map and for feeding data to a visual display, and a system memory to be shared by the central processing unit and the graphics controller, the graphics address being generated by the graphics controller and the system address denoting an address within the system memory, the address translator comprising:

a graphics memory dedicator for partitioning the system memory into a dedicated system memory for use by the graphics controller and a non-dedicated system memory for use by the central processing unit, the dedicated system memory corresponding to a base assigned memory within the graphics memory address map, the non-dedicated system memory corresponding to a portion of the graphics memory address map excluding the base assigned memory;

a dedicated system memory translator for mapping the graphics address to a corresponding system address within the dedicated system memory when the graphics address is within the base assigned memory;

a non-dedicated system memory translator for translating the graphics address to a system address within the non-dedicated system memory when the graphics address is within the portion of the graphics memory address map excluding the base assigned memory, the system address within the non-dedicated system memory designating a starting address of an available memory block within the non-dedicated system memory;

a boundary selector having a first input operatively coupled to the non-dedicated system memory translator and a second input operatively coupled to the graphics address, the boundary selector capable of selecting a boundary address within the available memory block in response to the system address generated by the non-dedicated system memory translator and the graphics address; and an address selector having a first input operatively coupled to the dedicated system memory translator, a second input operatively coupled to the boundary selector, and an output operatively coupled to a system address bus, the address selector placing the first input at the output when the graphics address is within the base assigned memory, and otherwise placing the second input at the output.

20. The address translator according to claim 19, wherein the system memory is a memory defined by a highest installed memory location and a lowest installed memory location, wherein the graphics memory address map is an address range defined by a top corresponding to a highest address that can be generated by the graphics controller and a bottom corresponding to a lowest address that can be generated by the graphics controller, wherein the graphics memory dedicator allocates the dedicated system memory starting from the highest installed memory location, and wherein the base assigned memory is defined by an area starting at the bottom of the graphics memory address map.

21. The address translator according to claim 20, the dedicated system memory translator further comprising:
  selecting logic having a first input operatively coupled to the graphics address and a second input operatively coupled to a memory location containing the highest installed memory location, wherein the selecting logic subtracts the graphics address from the highest installed memory location to generate the system address.

22. The address translator according to claim 21, wherein the system address within the system memory is defined by bits 0 through 27 inclusive, wherein the graphics address within the graphics memory address map is defined by bits 0 through 22 inclusive, the system address bits 0 through 17 inclusive are operatively coupled to the graphics address bits 0 through 17 inclusive, the system address bits 18 through 22 inclusive are formed by inverting the graphics address bits 18 through 22 inclusive, and the system address bits 23 through 27 inclusive are operatively coupled to bits 23 through 27 inclusive of the highest installed memory location.

23. The address translator according to claim 19, wherein the non-dedicated system memory translator comprises a look-up table having a plurality of locations, with each of the locations in the look-up table available for storing a starting address of an allocated block of the system memory, and each of the plurality of locations selectable by the graphics address.

24. The address translator according to claim 23, wherein a software driver requests from the operating system an additional amount of the system memory sufficient to accomodate a selected graphics mode, the additional amount comprising a plurality of memory blocks, wherein the software driver rejects one of the plurality of memory blocks upon a determination that the one of the plurality of memory blocks is less than a specified size, and stores a starting address of each unrejected one of the plurality of memory blocks in a different one of the plurality of locations.

25. The address translator according to claim 24, wherein the specified size is 64 K bytes.

26. The address translator according to claim 23, wherein one of the plurality of locations is selected in response to a third portion of the graphics address, the third portion comprising the uppermost bits of the graphics address.

27. The address translator according to claim 26, wherein the look-up table comprises 48 locations, each of the locations comprises bits 12 through 27 inclusive of an address within the system memory, and the third portion comprises bits 16 through 21 inclusive.

28. The address translator according to claim 23, wherein the boundary selector comprises a binary adder having a first data input operatively coupled to one of the plurality of locations within the look-up table corresponding to the graphics address, a second data input operatively coupled to a second portion of the graphics address, and an output.

29. The address translator according to claim 28, wherein the second portion comprises bits 12 through 15 inclusive of the graphics address.

30. The address translator according to claim 23, wherein the look-up table is stored in RAM.

31. The address translator according to claim 19, wherein a first portion of the graphics address is passed through unmodified.

32. The address translator according to claim 31, wherein the first portion comprises bits 0 through 11 inclusive.

33. The address translator according to claim 19, the address selector comprising a multiplexer having a first data input operatively coupled to the boundary selector, a second data input operatively coupled to the dedicated system memory translator, an output operatively coupled to a system address bus, and a select line placing the second data input at the output when the graphics address is within the base assigned memory, and otherwise placing the first data input at the output.

34. The address translator according to claim 33, the address selector further comprising:
  a comparator having a first input operatively coupled to the graphics address, a second input operatively coupled to a memory location containing a size of the base assigned memory, and an output operatively coupled to the select line, the output being 1 if the graphics address is within the base assigned memory, and otherwise being 0.

35. The address translator according to claim 34, wherein the memory location comprises a register.

36. An address translator for converting a graphics address to a system address, the address translator for use with a computer system having an operating system, a central processing unit, a graphics controller for generating graphics addresses which index a graphics memory address map and for feeding data to a visual display, and a system memory to be shared by the central processing unit and the graphics controller, the graphics address being generated by the graphics controller and the system address denoting an address within the system memory, the address translator comprising:
  means for partitioning the system memory into a dedicated system memory for use by the graphics controller and a non-dedicated system memory for use by the central processing unit, the dedicated system memory corresponding to a base assigned memory within the graphics memory address map, the non-dedicated system memory corresponding to a portion of the graphics memory address map excluding the base assigned memory;
  means for mapping the graphics address to a corresponding system address within the dedicated system memory when the graphics address is within the base assigned memory;

means for allocating an available memory block of the system memory on a 4 K byte boundary to the graphics controller when the graphics address is within the portion of the graphics memory address map excluding the base assigned memory;

means for translating the graphics address to a system address when the graphics address is within the portion of the graphics memory address map excluding the base assigned memory, the system address within the non-dedicated system memory designating a starting address of the available memory block;

boundary selecting means operatively coupled to the means for translating, the boundary selecting means adapted for selecting a boundary address within the available memory block based upon the system address generated by the means for translating and the graphics address; and address selecting means for outputting the system address generated by the mapping means when the graphics address is within the base assigned memory, and otherwise outputting the system address generated by the boundary selecting means.

* * * * *